(12) United States Patent  
Garrett et al.

(10) Patent No.: US 9,124,317 B1  
(45) Date of Patent: Sep. 1, 2015

(54) SUPPORTING HIGH DIMENSIONAL MU-MIMO BEAMFORMING BY SOUNDING MULTIPLE FRAMES WITH DIFFERENT SETS OF ANTENNA PATTERNS

(71) Applicant: Broadcom Corporation, Irvine, CA (US)

(72) Inventors: David Garrett, Tustin, CA (US); Jun Zheng, San Diego, CA (US); Nihar Jindal, San Mateo, CA (US)

(73) Assignee: BROADCOM CORPORATION, Irvine, CA (US)

(*) Notice: Subject to any disclaimer, the term of this patent is extended or adjusted under 35 U.S.C. 154(b) by 0 days.

(21) Appl. No.: 14/263,766

(22) Filed: Apr. 28, 2014

Related U.S. Application Data

(60) Provisional application No. 61/941,926, filed on Feb. 19, 2014.

(51) Int. Cl.
| | |
|---|---|
| *H04B 7/02* | (2006.01) |
| *H04B 7/04* | (2006.01) |
| *H04L 25/02* | (2006.01) |
| *H04B 7/12* | (2006.01) |
| *H04L 1/06* | (2006.01) |

(52) U.S. Cl.
CPC ............ *H04B 7/0408* (2013.01); *H04B 7/0452* (2013.01); *H04B 7/12* (2013.01); *H04L 25/0204* (2013.01); *H04L 25/0224* (2013.01); *H04L 1/06* (2013.01); *H04L 1/0618* (2013.01)

(58) Field of Classification Search
CPC ................................ H04L 1/0618; H04L 1/06
USPC .......................................................... 375/267
See application file for complete search history.

(56) References Cited

U.S. PATENT DOCUMENTS

| 7,848,444 B2 * | 12/2010 | Yamaura ...................... 375/267 |
| 2011/0273977 A1 * | 11/2011 | Shapira et al. ................ 370/208 |
| 2012/0114028 A1 * | 5/2012 | Davydov et al. ............. 375/224 |
| 2012/0213300 A1 * | 8/2012 | Yamaura ...................... 375/260 |
| 2013/0315330 A1 * | 11/2013 | Yamaura ...................... 375/267 |
| 2014/0093005 A1 * | 4/2014 | Xia et al. ..................... 375/267 |
| 2014/0219378 A1 * | 8/2014 | Yamaura ...................... 375/267 |
| 2014/0219385 A1 * | 8/2014 | Yamaura ...................... 375/295 |

* cited by examiner

*Primary Examiner* — Santiago Garcia
(74) *Attorney, Agent, or Firm* — Foley & Lardner LLP; Christopher J. McKenna; Paul M. H. Pua

(57) ABSTRACT

In some aspects, the disclosure is directed to methods and systems for performing channel estimation between a beamformer and a beamformee. A beamformer can determine that a beamformee is configured to perform channel estimation for up to a pre-configured number of transmit spatial streams from the beamformer. The pre-configured number of transmit spatial streams can be less than a plurality of transmit spatial streams of the beamformer. The beamformer can determine a plurality of subsets of transmit spatial streams from the plurality of transmit spatial streams. The beamformer can send a plurality of sounding frames to the beamformee for channel estimation based at least on the determined plurality of subsets of transmit spatial streams.

20 Claims, 6 Drawing Sheets

US 9,124,317 B1

SUPPORTING HIGH DIMENSIONAL MU-MIMO BEAMFORMING BY SOUNDING MULTIPLE FRAMES WITH DIFFERENT SETS OF ANTENNA PATTERNS

CROSS REFERENCE TO RELATED APPLICATIONS

This application claims the benefit of and priority to U.S. Provisional Application Ser. No. 61/941,926, filed Feb. 19, 2014, entitled "METHODS AND SYSTEMS FOR SUPPORTING HIGH DIMENSIONAL MU-MIMO BEAMFORMING BY SOUNDING MULTIPLE FRAMES WITH DIFFERENT SETS OF ANTENNA PATTERNS", assigned to the assignee of this application, and which is incorporated herein by reference for all purposes.

FIELD OF THE DISCLOSURE

This disclosure generally relates to systems and methods for improving transmission channels of a communications system. In particular, this disclosure relates to systems and methods for performing channel estimation between at least one beamformer and at least one beamformee.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA). As higher data throughput and other changes develop, newer standards are constantly being developed for adoption, such as a progression from IEEE 802.11n to IEEE 802.11ac.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: IEEE P802.11n™; and IEEE P802.11ac™. Although this disclosure can reference aspects of these standard(s), the disclosure is in no way limited by these standard(s).

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods for performing channel estimation between at least one beamformer and at least one beamformee.

A. Computing and Network Environment

Figure 1A:
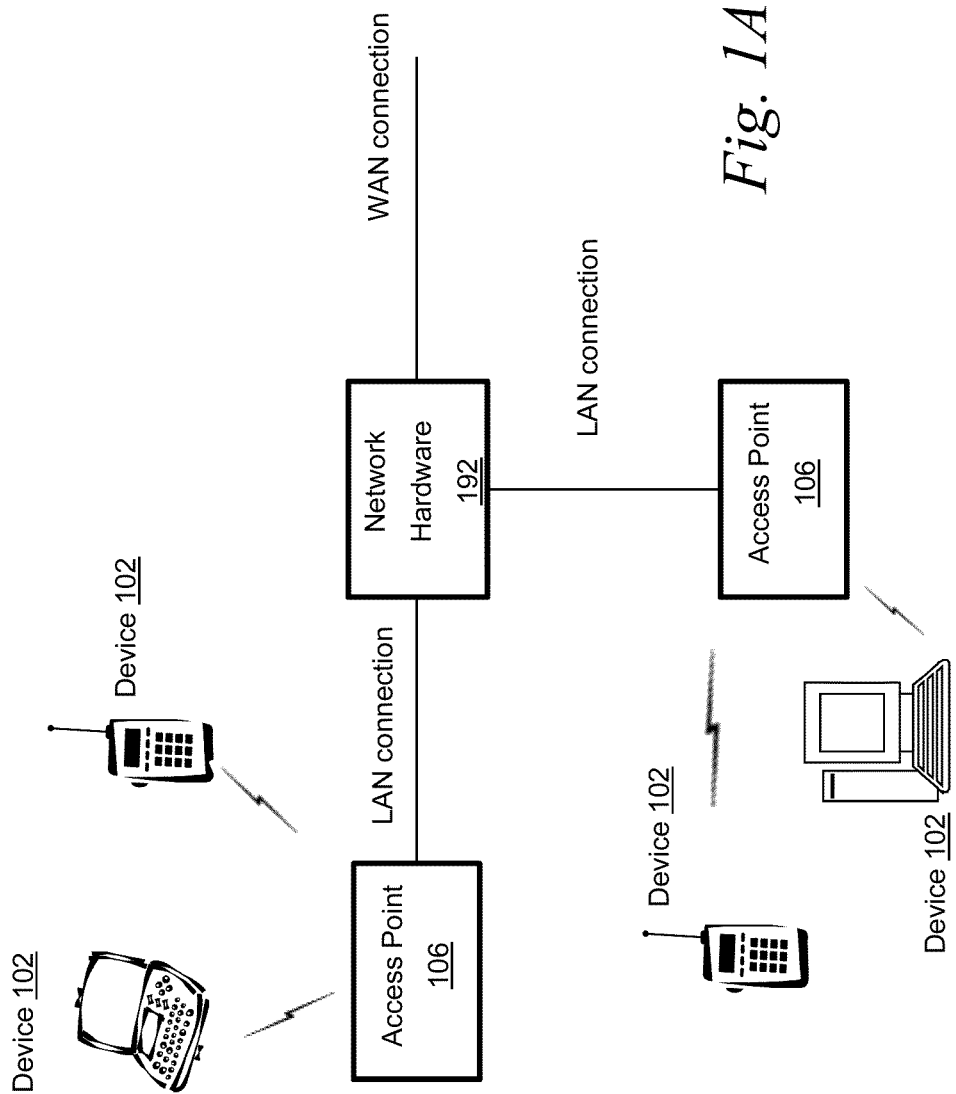
FIG. 1A is a block diagram depicting an embodiment of a network environment including one or more access points in communication with one or more devices or stations.

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) 106, one or more wireless communication devices 102 and a network hardware component 192. The wireless communication devices 102 can for example include laptop computers 102, tablets 102, personal computers 102 and/or cellular telephone devices 102. The details of an embodiment of each wireless communication device 102 and/or AP 106 are described in greater detail with reference to FIGS. 1B and 1C. The network environment can be an ad hoc network environment, an infrastructure wireless network environment, a subnet environment, etc. in one embodiment. The APs 106 can be operably coupled to the network hardware 192 via local area network connections. The network hardware 192, which can include a router, gateway, switch, bridge, modem, system controller, appliance, etc., can provide a local area network connection for the communication system. Each of the APs 106 can have an associated antenna or an antenna array to communicate with the wireless communication devices in its area. The wireless communication devices 102 can register with a particular AP 106 to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to AP 106.

In some embodiments an AP 106 includes a device or module (including a combination of hardware and software) that allows wireless communication devices 102 to connect to a wired network using wireless-fidelity (WiFi), or other standards. An AP 106 can sometimes be referred to as an wireless access point (WAP). An AP 106 can be implemented (e.g., configured, designed and/or built) for operating in a wireless local area network (WLAN). An AP 106 can connect to a router (e.g., via a wired network) as a standalone device in some embodiments. In other embodiments, an AP 106 can be a component of a router. An AP 106 can provide multiple devices access to a network. An AP 106 can, for example, connect to a wired Ethernet connection and provide wireless connections using radio frequency links for other devices 102 to utilize that wired connection. An AP 106 can be implemented to support a standard for sending and receiving data using one or more radio frequencies. Those standards, and the frequencies they use can be defined by the IEEE (e.g., IEEE 802.11 standards). An AP 106 can be configured and/or used to support public Internet hotspots, and/or on a network to extend the network's Wi-Fi signal range.

In some embodiments, the access points 106 can be used for (e.g., in-home or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more access points 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
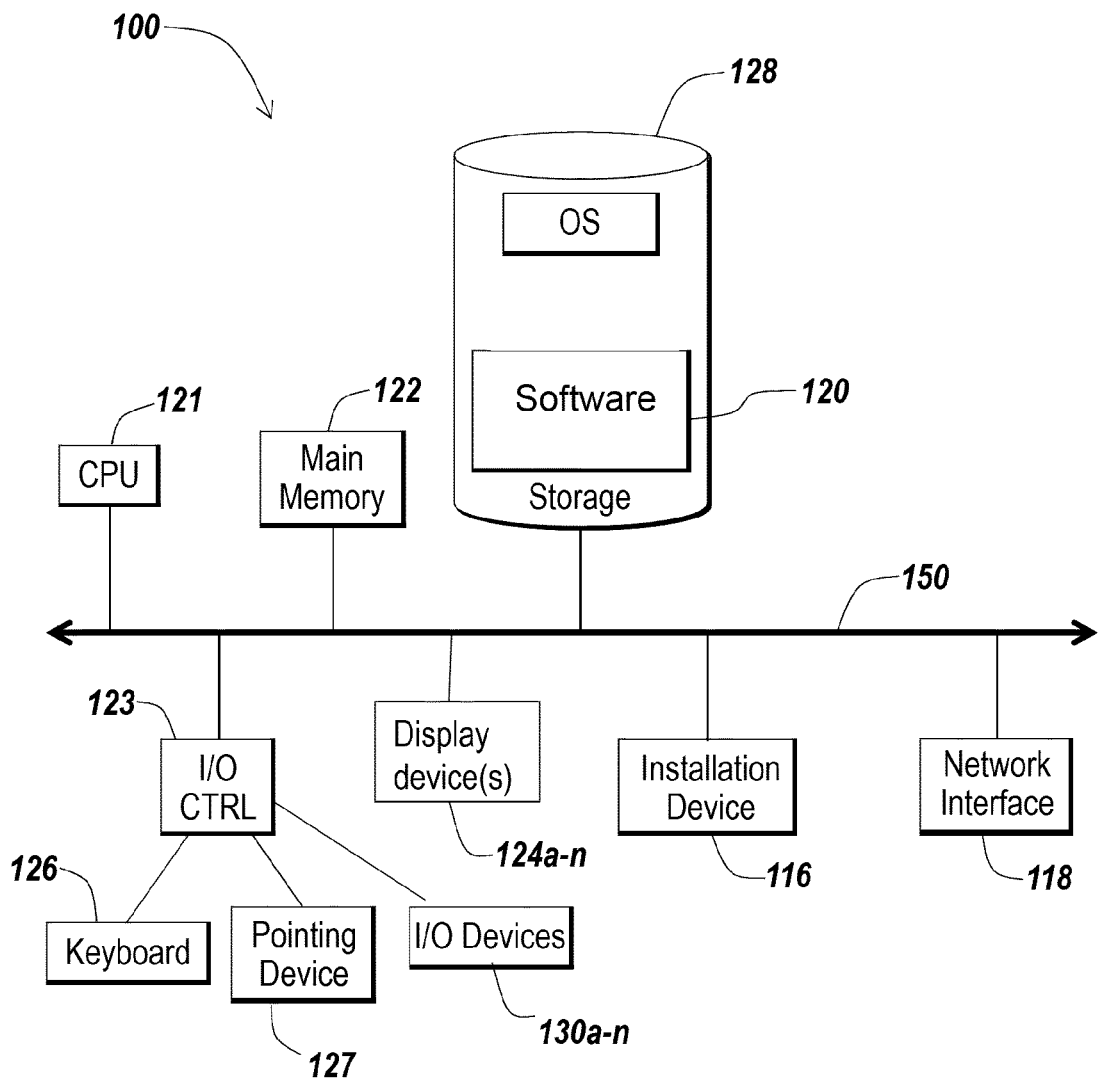
FIGS. 1B and 1C are block diagrams depicting embodiments of computing devices useful in connection with the methods and systems described herein.
Figure 1C:
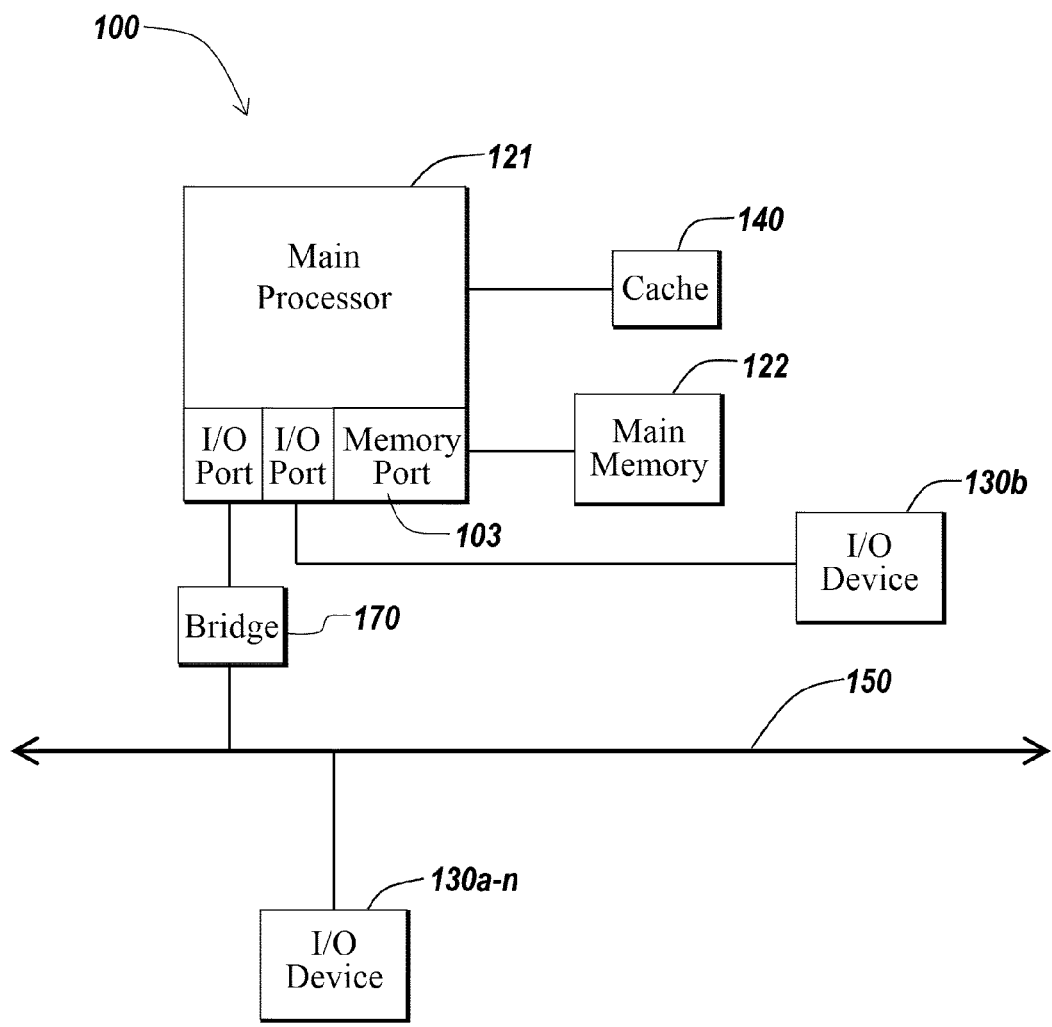

The communications device(s) 102 and access point(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or AP 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include an operating system and/or software. As shown in FIG. 1C, each computing device 100 can also include additional optional elements, such as a memory port 103, a bridge 170, one or more input/output devices 130a-130n, and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130 via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11 ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be configured for using multiple displays 124a-124n. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Channel Estimation Between at Least a Beamformer and at Least a Beamformee

Described herein are systems and methods for performing channel estimation between a beamformer and a beamformee (e.g., at least one AP 106 and at least one device 102) for example in a multi-user multiple-input and multiple-output (MU-MIMO) environment. The AP 106 (hereinafter sometimes generally referred to as an "access point" or "AP"), for example in a MU-MIMO configuration, can include an AP 106 that can communicate with each of a plurality of devices 102 (e.g., beamformees). The AP 106 can include a number of antennas and can support a number of spatial streams for transmission to a device (sometimes referred to as a station (STA) or user) 102. An AP 106 can leverage and use one or more sounding frames, such as null data packet (NDP) or NDP announcement (NDPA) frames or other control frames, to request the device 102 for channel estimation feedback.

The dimension of the AP 106 (embodied as a beamformer) sometimes refers to the number of spatial streams or the number of available transmit antennas the AP 106 supports. The dimension of the wireless communication device 102 (embodied as a beamformee) sometimes refers to the number of spatial streams the AP 106 can support for channel estimation. In some aspects, the present methods and systems can allow a higher dimension AP 106 or a coordinated set of APs 106 (both hereafter sometimes generally referred to as a single "beamformer", wherein the coordinated set of APs 106 can be configured to operate in some ways like a single beamformer), to use the beamformer's transmission antennas to steer and achieve full array gain even if paired against a device 102 of lower dimension. The device 102 can be capable of supporting less than the number of spatial streams that the AP 106 can include in a sounding, for performing multi-input multi-output (MIMO) channel estimation. The present solution can provide for multiple soundings using subsets of the beamformer's antennas, in place of a single sounding using all of the beamformer's antennas (which the beamformee does not support). A coordinated sequence of soundings from subsets of antennas can elicit different sets of MIMO channel estimation results from a low dimensional beamformee, which can be combined to produce full channel estimation information. For example, in certain embodiments, by defining the subsets to have overlapping antennas, the channel estimation feedback matrices for the different subsets/soundings can be merged to yield channel estimation for the full channel of the AP 106.

In some embodiments, multiple beamformers (e.g., APs 106) can operate in a coordinated fashion as if a higher dimensional beamformer is communicating with one or more beamformee(s). Multiple sounding reports from the same device 102 to the different APs 106 can be combined and/or shared between the coordinated APs 106, to understand the MU-MIMO channels between each beamformer-beamformee pair. In another embodiment, the coordinated APs 106 can be time and/or frequency synchronized (e.g., using frequency diversity or offset) to provide a sounding sequence that can appear like a single sounding sequence from a higher dimension beamformer.

In one aspect, this disclosure is directed to a method for performing channel estimation between a beamformer (e.g., AP 106) and a beamformee (e.g., device 102). The method can include determining, by a beamformer, that a beamformee is configured to perform channel estimation for up to a pre-configured number of transmit spatial streams from the beamformer. The pre-configured number of transmit spatial streams can be less than a plurality of transmit spatial streams of the beamformer. The beamformer can determine a plurality of subsets of transmit spatial streams from the plurality of transmit spatial streams. The beamformer can send a plurality of sounding frames to the beamformee for channel estimation based at least on the determined plurality of subsets of transmit spatial streams.

In some embodiments, the beamformer can determine the plurality of subsets, each of the plurality of subsets having at least one transmit spatial stream from a same antenna of the beamformer as at least one transmit spatial stream in another subset from the plurality of subsets. The beamformer can receive responses from the beamformee to the plurality of sounding frames. The responses can include channel estimation for the plurality of subsets of transmit spatial streams. The beamformer can generate full channel estimation information based on the responses. The full channel estimation information can include channel estimation information corresponding to all the transmit spatial streams that can be provided by the beamformer.

In certain embodiments, the beamformer can steer all transmit antennas of the beamformer based on the full channel estimation information. The beamformer can configure a first beamformer and a second beamformer to operate as the beamformer 106. The beamformer can configure a first beamformer and a second beamformer to operate as the beamformer, the first beamformer and the second beamformer operably coupled via a backbone connection. The beamformer can communicate to a plurality of beamformees. The beamformer can configure a first beamformer and a second beamformer to operate as the beamformer, the first beamformer and the second beamformer using frequency diversity to simultaneously send a sounding frame from the first beamformer and a sounding frame from the second beamformer.

In another aspect, the disclosure is directed to a method for performing channel estimation between a beamformer and a beamformee. The method can include determining, by a beamformee, that a beamformee is configured to perform channel estimation for up to a pre-configured number of transmit spatial streams from the beamformer. The pre-configured number of transmit spatial streams can be less than a plurality of transmit spatial streams of the beamformer. The beamformer can determine a plurality of subsets of transmit spatial streams from the plurality of transmit spatial streams, for forming a plurality of sounding frames to the beamformee. Each of the plurality of subsets can have at least one transmit spatial stream from a same antenna of the beamformer as at least one transmit spatial stream in another subset from the plurality of subsets.

In some embodiments, the AP 106, e.g., embodied as a beamformer, can receive responses from the device 102, e.g., embodied as a beamformee, to the plurality of sounding frames. The responses can include channel estimation for the plurality of subsets of transmit spatial streams. The AP 106 can generate full channel estimation information based on the received responses. The full channel estimation information can include channel estimation information corresponding to all the transmit spatial streams that the AP 106 can provide. The AP 106 can steer the plurality of transmit antennas of the AP 106 based on the full channel estimation information.

In yet another aspect, this disclosure is directed to a method for performing channel estimation between a plurality of APs 106 embodied as beamformers and at least one device 102 embodied as a beamformee. The method can include configuring a first AP 106 and a second AP 106 to communicate with a first device 102. The first AP 106 can support a first plurality of transmit spatial streams. The second AP 106 can support a second plurality of transmit spatial streams. The first AP 106 and the second AP 106 can determine, between the first AP 106 and the second AP 106, a plurality of subsets of transmit spatial streams from the first plurality of transmit spatial streams and the second plurality of transmit spatial streams. The first AP 106 and the second AP 106 can coordinate, between the first and the second beamformers 106, transmission of a plurality of sounding frames to the first device 102 for channel estimation based at least on the determined plurality of subsets of transmit spatial streams.

In some embodiments, the first AP 106 and the second AP 106 are configured to communicate with the first device 102. The first AP 106 and the second AP 106 can be operably coupled via a backbone connection. The first AP 106 and/or the second AP 106 can combine at least some responses from the first device 102 to the plurality of sounding frames, the responses including channel estimation for the plurality of subsets of transmit spatial streams. The first AP 106 and/or the second AP 106 can generate full channel estimation information between the first AP 106 and the second AP 106, based on the combination of the at least some responses. The first AP 106 and the second AP 106 can be configured to communicate with a plurality of beamformees 102. The first AP 106 and the second AP 106 can coordinate, between the first AP 106 and the second AP 106, transmission of a plurality of sounding frames to a plurality of the devices 102. The first AP 106 and/or a second AP 106 can use frequency diversity to simultaneously send a sounding frame from the first AP 106 and a sounding frame from the second AP 106.

Figure 2A:
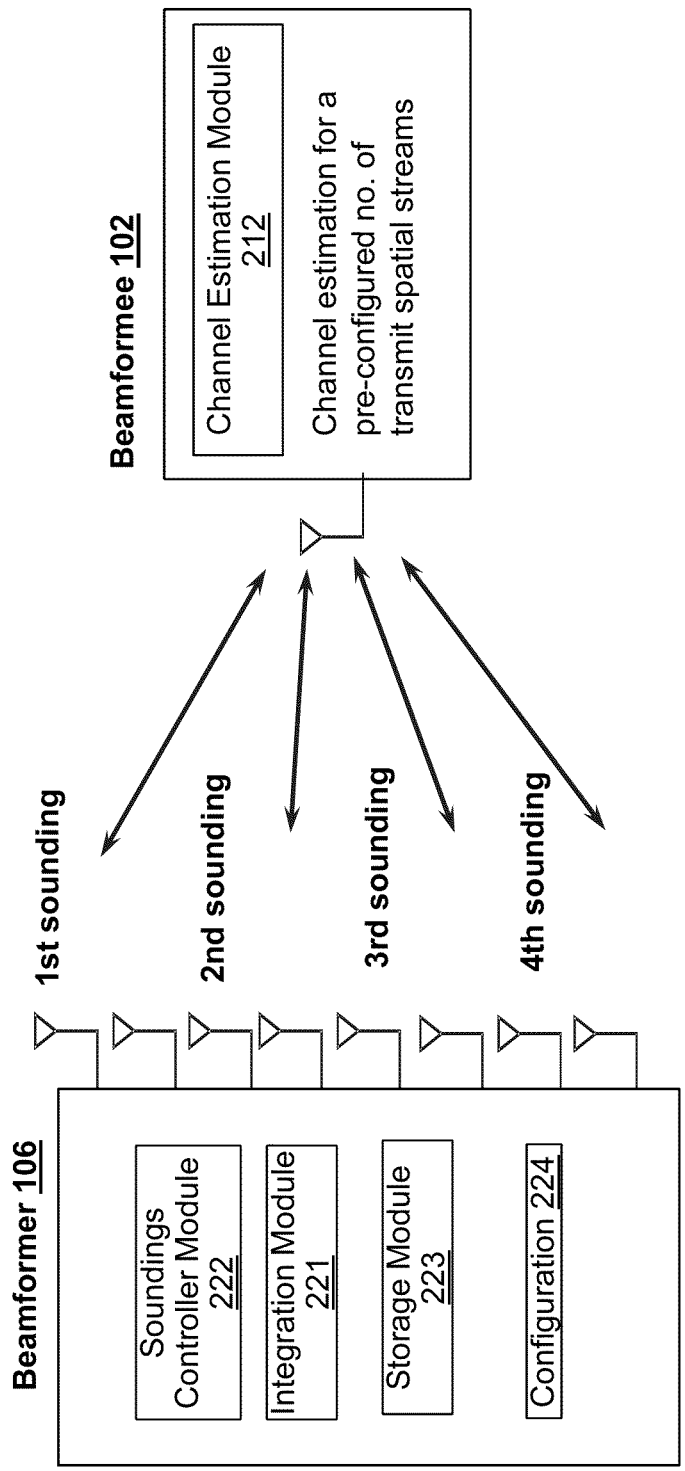
FIG. 2A is a block diagram depicting an embodiment of a system for performing channel estimation between a beamformer and a beamformee.

Referring to FIG. 2A, an embodiment of a system for performing channel estimation between at least one AP 106 and at least one device 102 is depicted. In brief overview, one embodiment of the system can include the AP 106 in communication with the device 102. The AP 106 can include a soundings controller module (SCM) 222, an integration module 221, a storage module 223 and/or a configuration 224. The device 102 can include a channel estimation module (CEM) 212. The AP 106 and/or the devices 102 can each include a radio, and can include a transmitter and/or a receiver. The AP 106 can include a plurality of antennas (e.g., phase array antennas).

In some embodiments, the system can support at least some aspects of a MU-MIMO transmission configuration 224 between the AP 106 embodied as a beamformer and the device 102 embodied as a beamformee. For example, the AP 106 can be of higher dimensionality relative to the device 102. The device 102 can perform channel estimation for a number of spatial communication streams up to the dimensionality of the device 102. Device 102 can provide channel estimation for more dimensions than it has antennas in one embodiment. For example, device 102 can have only one antenna but can have the capability to estimate a three antenna channel. By way of illustration, the AP 106 can be of higher dimensionality or capability than some of the devices 102 (e.g., older generation beamformees) in deployment. In one embodiment, the device 102 can for example be capable of performing channel estimation for up to a pre-configured number of transmit spatial streams from the AP 106, the pre-configured number of transmit spatial streams being less than a number of transmit spatial streams that the AP 106 can provide.

The AP 106 can be implemented (e.g., configured and/or built) to support, simultaneously or otherwise, a first number of transmit streams, channels or connections, for instance within a transmission or sounding frame. The AP 106 can include a coordinated set of APs 106. The sounding frame can include an MU-MIMO frame, SU-MIMO frame and/or an NDP frame. The AP 106 can be implemented to include a first number of transmit chains and/or transmit antennas. The device 102 can be implemented to support (simultaneously or otherwise) a second number of spatial streams, channels or connections (hereafter sometimes generally referred to as "spatial streams" or "Nss"). The second number of spatial streams can be lower than the first number of streams.

In some embodiments, a total or predetermined number of spatial streams that a device 102 can support can be stored or indicated in the beamformee's capability field—"Compressed Steering Number of Beamformer Antennas Supported." This field can be defined or included in a very high throughput (VHT) capabilities information field, e.g., of a MIMO frame or sounding frame. This field can include or indicate a Nss that the AP 106 can handle or support in an NDP frame, for example. This field can set the range of transmit spatial dimensions for which the device 102 can perform channel estimation, generate a proper beamforming report, and/or create a sounding feedback frame (sometimes generally referred to as a "response") to the AP 106. In some embodiments, this capability is fixed once the device 102 or AP 106 is implemented and/or deployed in the field, and in some embodiments not upgradeable (e.g., through a software patch).

In some embodiments, the pre-configured or ceiling Nss of the device 102 can limit transmit beamforming performance, e.g., of the AP 106 and/or the device 102. For example, when the device's channel estimation capability fails to support the full extent of the AP's transmit antennas, the AP 106 might not be able to use all of its transmit antennas for steering, and might not be able to achieve full array gain. In some embodiments, for multi-user transmit beamforming, the AP 106 might have to use the minimal sounding capability among the devices 102 with different sounding capabilities. The AP 106 might have to turn on fewer than the full set of antennas, corresponding to the minimal sounding capability. Existing transmit-beamforming (TXBF) capable devices with limited sounding capabilities can remain available in the market and/or remain deployable in the field for some time, before these devices are eventually replaced by higher capability devices. The present methods and systems, in some aspects, provide support for such devices 102.

In some embodiments, the AP 106 includes a SCM 222. The SCM 222 can manage and/or control transmission of a plurality of soundings (e.g., NDP soundings) to a low-capability device 102. The SCM 222 can include hardware, or a combination of hardware and software. For example, the SCM 222 can include any application, program, library, script, task, service, process or any type and form of executable instructions executing on hardware of the AP 106. In one embodiment, the SCM 222 includes a set of executable instructions executing on a core or processor of the AP 106. The SCM 222 can include circuitry designed and/or constructed to perform any of the operations and functions described herein. In some embodiments, the SCM 222 is configured to control transmission of sounding frames to the AP 106 via one or more antennas of the AP 106. For example, the SCM 222 can be configured to allocate, select or assign certain antennas to participate in one of more soundings within a set of soundings. The SCM 222 can for example tune a subset of the beamformer's antennas (e.g., phase array antennas) to participate in a particular sounding.

In some embodiments, the SCM 222 includes firmware executing on the AP 106 hardware. The firmware can operate in a layer of a protocol stack of the AP 106 (e.g., in an upper layer). In certain embodiments, the SCM 222 operates in the MAC layer, e.g., residing between a lower layer of MAC and a higher layer of MAC. The AP 106 or SCM 222 can partition, allocate or otherwise assign the plurality of antennas into a plurality of subsets of antennas, e.g., based on a configuration 224. In some embodiments, an antenna can be assigned to more than one of the subsets. Each subset of antennas can be selected according to a configuration 224, which can be consistent with one or more predefined rules, policies, requirements and/or guidelines. For example, each subset of antennas can include antennas physically adjacent to each other on the AP 106, and/or selected according to a certain order or sequence. In some embodiments, each subset of antennas can include antennas that are separated from each other by at least another antenna not in the subset, e.g., to include some spatial degree of freedom or separation. In some embodiments, the SCM 222 configures each subset to include at least one antenna common to at least one other subset.

The SCM 222 can manage or control the transmission of a plurality of soundings corresponding to the subsets of antennas. Each sounding can cover a subset of the AP's antennas. The SCM 222 or AP 106 can transmit or issue the soundings in a particular order. The SCM 222 or AP 106 can transmit or issue the soundings distributed or staggered over a period of time, e.g., at predefined intervals. The SCM 222 or AP 106 can provide sufficient time for the AP 106 to process each sounding and/or provide a response to each sounding, before sending a next sounding frame. The SCM 222 can store information about the configured subsets, and/or information about a sequence of corresponding soundings, to the configuration 224 and/or storage module 223.

The configuration 224 can include, maintain or store information about assignment or allocation of antennas to subsets for sounding purposes, and/or information about a sequence of soundings corresponding to the configured subsets. The configuration 224 can include information about connecting or coupling a specific antenna to a particular transmit chain.

The configuration 224 can include a schedule or timing information for performing soundings. The configuration 224 can be stored in a storage module 223. The storage module 223 can include one or more interconnected storage devices, such as any embodiment of storage devices 128, 140, 122, described above in connection with FIGS. 1B and 1C. In some embodiments, the SCM 222 and/or the integration module can generate, access and/or update the configuration.

The configuration 224 can include a list, table or other database structure, and can include at least one entry, record or specification corresponding to each device 102 for example. The configuration 224 can be specified and/or defined in a file or a collection of records, stored or maintained in the storage module 223. A SCM 222 and/or integration module can access a portion of the configuration, to implement partial channel estimation through multiple soundings. For example, an integration module can use a hash to perform lookup in the configuration 224 for an antenna or device, to process channel estimation feedback.

In some embodiments, the device 102 includes a CEM 212. The CEM 212 can process a sounding frame received by the device 102. For example, the CEM 212 can perform channel estimation and/or provide channel estimation feedback. Channel estimation can include any form of channel measurement and/or calibration, or channel response determination. Channel estimation results can be used to provide feedback to the AP 106 on how to radiate energy in a particular direction, on frequency-dependency within a channel, on signal-to-noise ratio (SNR), and/or on appropriate data rate adjustments, for example. The CEM 212 can include hardware, or a combination of hardware and software. For example, the CEM 212 can include any application, program, library, script, task, service, process or any type and form of executable instructions executing on hardware of the AP 106. In one embodiment, the CEM 212 includes a set of executable instructions executing on a core or processor of the AP 106.

The CEM 212 can include circuitry designed and/or constructed to perform any of the operations and functions described herein. In some embodiments, the CEM 212 is pre-configured to perform channel estimation in a particular environment, e.g., a SU-MIMO or MU-MIMO environment. In some embodiments, the CEM 212 includes firmware executing on the hardware of the device 102. The firmware can operate in a layer of a protocol stack of the device 102 (e.g., in an upper layer). The CEM 212 can operate in the MAC layer, e.g., residing between a lower layer of MAC and a higher layer of MAC. The CEM 212 can provide the channel estimation feedback for inclusion in a response to a sounding frame from the AP 106. The CEM 212 can manage or direct the transmission of one or more responses to the AP 106.

In some embodiments, the AP 106 can include an integration module 221. The integration module 221 can manage, track and/or process the responses received from the device 102. The integration module 221 can store information (e.g., channel estimation information) from one or more responses in a storage module 223. The integration module 221 can order and/or combine channel estimation information from the response, for example, based at least in part on information stored in the configuration 224 (e.g., information about the configured subsets, and/or the sequence of soundings corresponding to the configured subsets).

The integration module 221 can include hardware, or a combination of hardware and software. For example, the integration module 221 can include any application, program, library, script, task, service, process or any type and form of executable instructions executing on hardware of the AP 106. In one embodiment, the integration module 221 includes a set of executable instructions executing on a core or processor of the AP 106. The integration module 221 can include circuitry designed and/or constructed to perform any of the operations and functions described herein. In some embodiments, the integration module 221 includes firmware executing on the hardware of the AP 106. The firmware can operate in a layer of a protocol stack of the AP 106 (e.g., in an upper layer). In certain embodiments, the integration module 221 operates in the MAC layer, e.g., residing between a lower layer of MAC and a higher layer of MAC. In some embodiments, the integration module 221 is configured to combine, integrate, merge, normalize, adjust and/or aggregate information from the responses to obtain full channel information.

In some embodiments, the integration module 221 relies on each subset having at least one overlapping (or common) antenna with another subset, to act as an anchor point, or point of reference or comparison. In some embodiments, the channel estimation feedback can be in the form of a matrix, for example as defined under the 802.11 standard (e.g., 802.11ac). The matrix can include elements, corresponding to a MIMO channel estimation of a subcarrier for a sounding. Each element can include a complex scalar value. Each element can correspond to channel estimation for a transmitter antenna of the AP 106 to a receiver antenna of the device 102. Between two feedback matrices from two soundings, the elements in one matrix can have a phase difference or phase mismatch with elements in the other matrix. In some cases, this phase difference or mismatch can exist even for soundings corresponding to the same channel (e.g., the same transmit and receive antennas). The integration module 221 can address, remove and/or adjust for this phase difference or mismatch by using matrix elements corresponding to the overlapping or common antennas. For example, the integration module 221 can use a phase value obtained from one feedback matrix to adjust or compensate against elements in another matrix (e.g., that also has the overlapping or common antenna).

Referring again to FIG. 2A, and by way of illustration, the AP 106 can include seven antennas (e.g., A1-A7), and the device 102 can support up to four transmit streams. The SCM 222 can determine two subsets of antennas (e.g., A1-A2-A3-A4, and A4-A5-A6-A7) to implement two soundings that the device 102 can process separately. Various groupings and combinations of antennas forming subsets of up to the spatial-stream limit of the device 102 are possible, and are not limited to the groupings illustrated herein. Based on the example groupings, the AP 106 can perform two soundings, and can receive two responses corresponding to these soundings.

In one embodiment, if a full channel sounding had been performed in the above example, the full channel description can be in the following form:

$$H = [\, h_1 \quad h_2 \quad \ldots \quad h_7 \,]$$

With two consecutive soundings based on the antenna groupings or subsets illustrated above, the partial channel descriptions (H) can be represented as following:

$$H_1 = S_1 V_1 = [\, h_{11} \quad h_{12} \quad h_{13} \quad h_{14} \,];$$
$$H_2 = S_2 V_2 = [\, h_{21} \quad h_{22} \quad h_{23} \quad h_{24} \,];$$

Each channel description or feedback can include a product of an orthonormal matrix (V) and a real diagonal matrix (S), for example as specified in a 802.11 standard (e.g., 802.11ac). The overlapping elements can include $^h14$ and $^h21$ (corresponding to A4) for example.

Based on the two sets of channel descriptions, the full channel can be estimated or reconstructed (e.g., by the integration module 221) as follows, in one embodiment:

$$H = \begin{bmatrix} h_{11} & h_{12} & h_{13} & h_{14} & \frac{h_{22}h_{14}}{h_{21}} & \frac{h_{23}h_{14}}{h_{21}} & \frac{h_{24}h_{14}}{h_{21}} \end{bmatrix}$$

In some embodiments, the phase adjustment or correction can be performed using an adjustment component, for example $$\frac{h_{14}}{h_{21}},$$

which is applied to the fifth, sixth, and seventh element in the full channel matrix H above. Various other adjustment components can be applied to some of the other elements.

In some embodiments, the present methods can be implemented or applied transparent to a low capability device 102. For example, the device 102 might not even realize that the multiple soundings are coordinated to allow full channel estimation for the AP 106. In some embodiments, the device 102 (and its channel estimation features) might not have to be re-configured to operate with the high capability AP 106. A high dimensional steering matrix (for single-user (SU) or multi-user (MU) operation) can be constructed from the responses by the integration module 221 and applied to a low capability device 102 to achieve full antenna array gain.

Figure 2B:
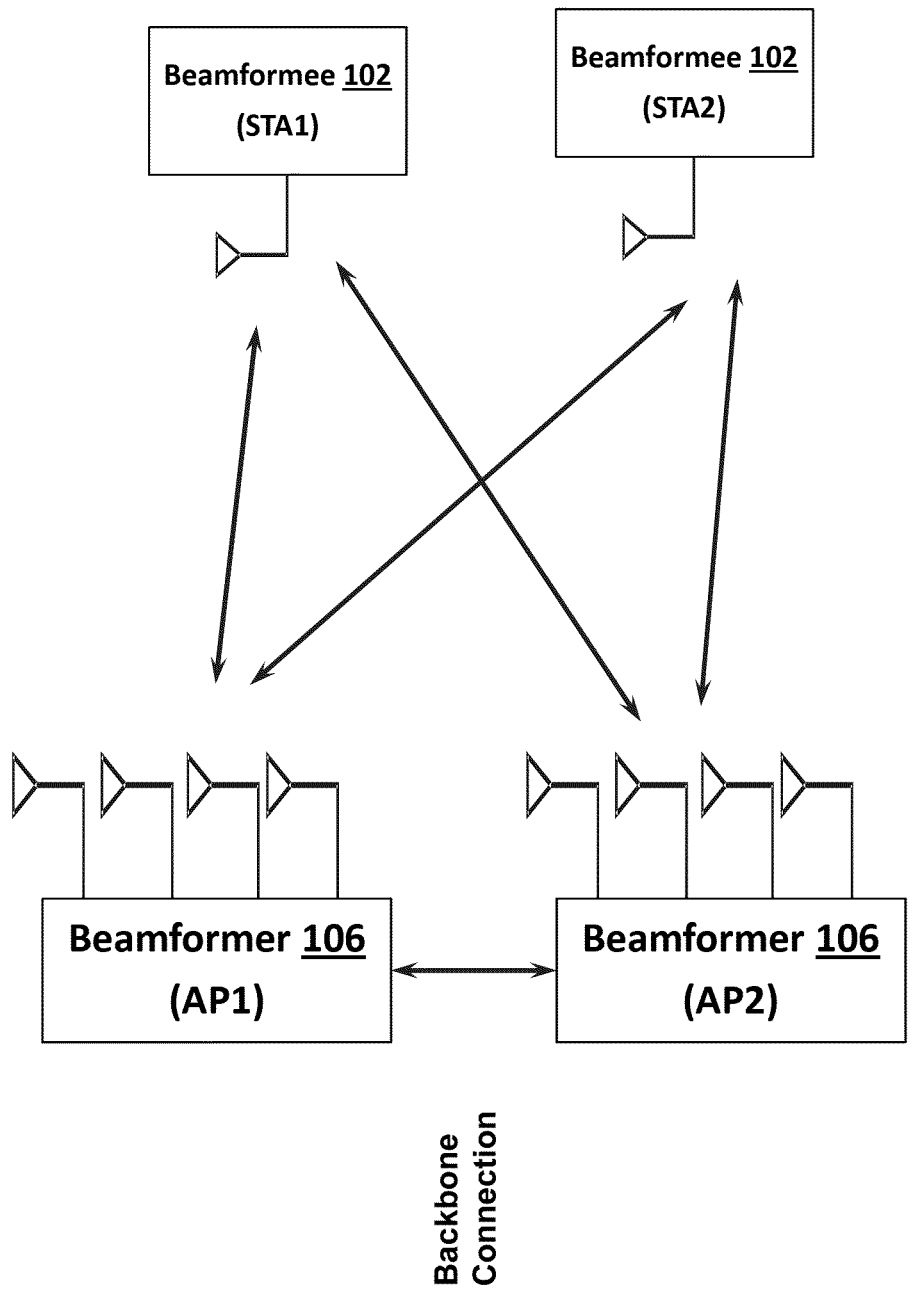
FIG. 2B is a block diagram depicting an embodiment of a system for performing channel estimation between at least one beamformer and at least one beamformee.

In some embodiments, a high dimensional transmit structure (e.g., a single AP 106) can be formed by combining and/or coordinating two or more lower dimensionality beamformers 106. Referring to FIG. 2B, an embodiment of a system for performing channel estimation between at least one AP 106 and at least one device 102 is depicted. In brief overview, the system can include at least two APs operably coupled together to effectively operate as a single AP 106 (hereafter sometimes referred to as "coordinated beamformers" or as a single "beamformer"). The coordinated beamformers can be in communication with one or more devices 102 embodied as beamformees. The coordinated beamformers can include a SCM 222, an integration module 221, a storage module 223 and/or a configuration 224, each of which can include one or more features described above in connection with FIG. 2A. Each of these modules can reside on at least one of the coordinated beamformers (APs 106), or can reside at one or more networked locations.

In some embodiments, increasing or combining the number of antennas at the AP 106 end can provide better array gain and diversity. By way of illustration, for single-user transmit beamforming, an array gain can be represented by 10*log 10(NTX/Nss) dB, and a corresponding diversity order can be represented as NTX*NRX, where NTX can represent the number of transmit antennas, and NRX can represent the number of receive antennas. A large number of transmit antennas at the beamformer side can provide more spatial degrees of freedom, e.g., allowing for improved link quality. In some embodiments, total capacity of the system can increase linearly with respect to the number of beamformer antennas (e.g., in an asymptotic sense). A larger number of transmit antennas can support or host more beamformees (e.g., multi-user STAs), for instance using a multi-user steered frame to achieve better spectrum efficiency. In certain embodiments, a larger number of transmit antennas can allow for better multi-user precoding matrices for a given set of beamformees (e.g., multi-user STAs). A significant portion of existing access points 106 are implemented with a limited number of transmit antennas, e.g., up to three antennas. In accordance with certain aspects of the disclosure, transmit antennas from a few low dimensional beamformers 106 can be combined or aggregated to achieve better performance.

In some embodiments, multiple lower dimensional APs 106 are connected to each other, for example through an Ethernet backbone or other connection. These APs 106 can be coordinated to generate multiple sounding sequences between the APs 106 and the devices 102, to determine the channels (e.g., MU-MIMO channels) between each beamformer-beamformee pair. Sounding feedback reports from different devices 102 can be shared and/or processed between the coordinated beamformers (e.g., APs 106), for example, using the techniques described in connection with at least FIGS. 2A and 2C. For example, multiple sounding feedback reports from the same device 102 to multiple APs 106 can be combined in such a way as if the APs 106 include a single higher dimensional AP 106 communicating to the device 102. Multi-user precoding can be performed, for example, using post-combined MU-MIMO channels. When performing multi-user steering, the coordinated beamformers 106 might have to coordinate the steering frame transmission so that the steering frame as formed appears to come from a larger dimensional AP 106 rather than several different lower dimensional APs 106. The coordinated APs 106 can be time synchronized. For example, the APs 106 can coordinate steering frame transmission through a backbone Ethernet or other connection.

In certain embodiments, the system can time and/or frequency synchronize the coordinated APs 106, for example by adjusting frame timing and/or carrier frequency offset (CFO). The coordinated APs 106 can transmit a sounding sequence in a coordinated manner as if the sequence is sent from a single larger dimensional AP 106. The precoding matrix and/or steering frame can be formed in a coordinated manner. When performing multi-user steering, the coordinated APs 106 might have to coordinate the steering frame transmission so that the steering frame as formed appears to come from a larger dimensional AP 106 rather than several different lower dimensional APs 106. In performing frequency synchronization, the coordinated APs 106 can synchronize their carrier frequency offset or CFO. This can be performed by observing uplink transmission from different devices 102, sharing the CFO among the APs 106, and (e.g., in time). In some embodiments, the coordinated APs 106 can be time synchronized. For example, one of the APs 106 can begin frame transmission first (e.g., L-STF and L-LTF signals transmitted first). The rest of the coordinated APs 106 can join in the transmission starting from the VHT-STF signal, for example by monitoring for presence and/or timing of the L-STF and L-LTF signal on the air.

Figure 2C:
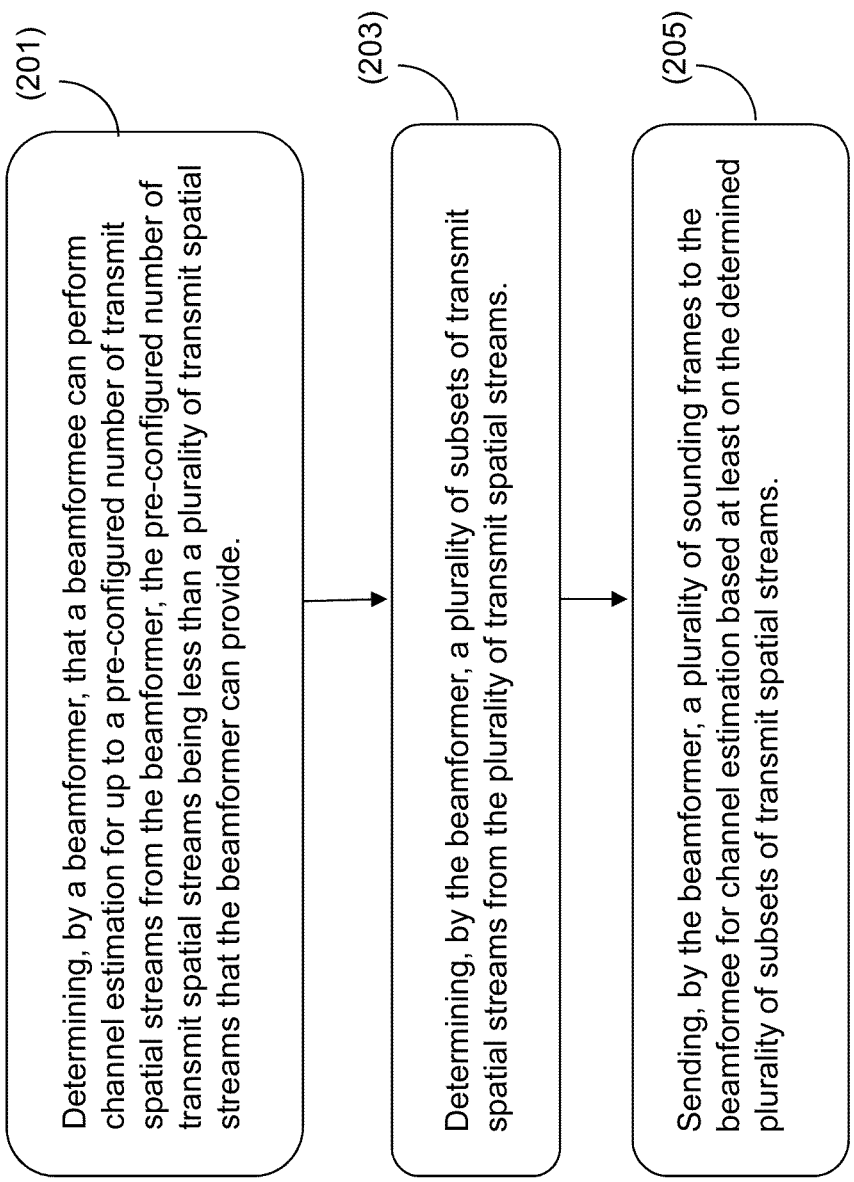
FIG. 2C is a flow diagram of an embodiment of a method for performing channel estimation between at least one beamformer and at least one beamformee.

Referring now to FIG. 2C, one embodiment of a method for performing channel estimation between at least one beamformer and at least one beamformee is depicted. In one embodiment, the beamformer is an of AP 106 or a coordinated AP and the beamformee is one or more of devices 102. The method can include determining, by the beamformer, that the beamformee is configured to perform channel estimation for up to a pre-configured number of transmit spatial streams from the beamformer, at an operation 201. The pre-configured number of transmit spatial streams can be less than a plurality of transmit spatial streams of the beamformee. The beamformer can determine a plurality of subsets of transmit spatial streams from the plurality of transmit spatial streams, at an operation 203. The beamformer can send a plurality of sounding frames to the beamformee for channel estimation based at least on the determined plurality of subsets of transmit spatial streams, at an operation 205.

Referring now to operation 201, and in some embodiments, the beamformer can determine that the beamformee is configured to perform channel estimation for up to a pre-configured number of transmit spatial streams from the beamformer. The pre-configured number of transmit spatial streams can be less than a plurality of transmit spatial streams of the beamformee. The beamformer determines or recognizes that the beamformee has a low capability or is a low dimensional beamformee. The beamformer determines this based at least on a predetermined number of spatial streams that the beamformee can support, which can be stored or indicated in the beamformee's capability field. The beamformee can communicate this capability field to the beamformer via a transmitted frame or response. The beamformer can compare the predetermined number of spatial streams that the beamformee can support, with the number of spatial streams or transmit antennas supported by the beamformer. The beamformer can determine, e.g., based on the comparison, that the beamformee cannot support full channel estimation with the beamformer (e.g., via a single sounding).

In some embodiments, the beamformer can communicate to a plurality of beamformees. The beamformer can determine, for each of the plurality of beamformees, the number of spatial streams supported by the corresponding beamformee in one sounding. In some embodiments, the beamformer can include a coordinated set of two or more beamformers. The coordinated set of two or more beamformers might be operably coupled together, e.g., connected via a Ethernet backbone. The coordinated set of two or more beamformers can be configured to operate like a higher dimensional beamformer. For example, one of the beamformers can determine the dimensionality (e.g., the pre-configured number of supported transmit spatial streams) of a beamformee, and can communicate the dimensionality to one or more of the other coordinated beamformers. The coordinated set of two or more beamformers can be operably coupled together for communicating with the beamformee, or with a plurality of beamformees. The coordinated set of two or more beamformers can operate (e.g., forming and sending sounding frames) according to a configuration.

By way of illustration, an administrator, a control module or a control device can configure a first beamformer and a second beamformer, for example via a configuration 224 (e.g., see FIG. 2A), to operate as a beamformer (e.g., a single high dimensional beamformer). The first beamformer and the second beamformer can be configured to communicate with a first beamformee. The first beamformer can support a first plurality of transmit spatial streams. The second beamformer can support a second plurality of transmit spatial streams. The first beamformer and the second beamformer can be operably coupled and/or coordinated via a connection. The first beamformer and the second beamformer can be configured to communicate with one or a plurality of beamformees. The configuration 224 can provide rules, policies and/or guidance on coordinating operations between the first beamformer and the second beamformer, to communicate with one or more beamformees. The coordinated beamformer can access the configuration 224 to define one or more soundings to transmit to a beamformee.

The first beamformer and the second beamformer can coordinate, between the first beamformer and the second beamformer, transmission of a plurality of sounding frames to a plurality of beamformees 102. The first beamformer and the second beamformer can use frequency diversity to simultaneously send a sounding frame from the first beamformer and a sounding frame from the second beamformer. The first beamformer and the second beamformer can be configured to operate as a beamformer, for example by using frequency diversity to simultaneously send a sounding frame from the first beamformer and a sounding frame from the second beamformer, to one or more beamformees. The system can time and/or frequency synchronize the coordinated beamformers, for example by adjusting frame timing and/or CFO.

When performing multi-user steering, the coordinated beamformers can coordinate the steering frame transmission so that the steering frame as formed appears to come from a larger dimensional beamformer rather than several beamformers. In performing frequency synchronization, the coordinated beamformers can observe uplink transmission from different beamformees, share a CFO among the beamformers, and implement proper adjustment (e.g., frame timing adjustment) so that the beamformers are aligned (e.g., in time). In some embodiments, the SCM 222 can time-synchronize the coordinated beamformers. For example, one of the beamformers can begin frame transmission before other beamformers (e.g., L-STF and L-LTF signals transmitted first). The rest of the coordinated beamformers can join in the transmission starting from the VHT-STF signal, e.g., by monitoring for presence and/or timing of the L-STF and L-LTF signal on the air.

Referring now to operation 203, and in some embodiments, the beamformer can determine a plurality of subsets of transmit spatial streams from the plurality of transmit spatial streams. In some embodiments, each of the plurality of subsets can have at least one transmit spatial stream from a same antenna of the beamformer as at least one transmit spatial stream in another subset from the plurality of subsets. Based on the determination that the beamformee is configured to perform channel estimation for up to the pre-configured number of transmit spatial streams, the beamformer can identify or determine the subsets of transmit spatial streams. Based on the determination, the beamformer can form each subset to include a number of transmit spatial streams up to the pre-configured number of transmit spatial streams. Based on the determination, the beamformer can define or form a plurality of sounding frames to send to the beamformee. Some or all of operations disclosed herein can be performed by a SCM 222 of a beamformer, for instance.

The beamformer or SCM 222 can partition, allocate or otherwise assign the plurality of antennas into a plurality of subsets of antennas, e.g., based on the configuration 224. The beamformer or SCM can identify subsets of its transmit antennas or transmit streams for each of the plurality of sounding frames. The beamformer can assign, allocate or select a subset of the beamformer's transmit antennas or transmit streams for a first one of the plurality of sounding frames. In some embodiments, the subsets of antennas can include no overlapping or common antenna between any two subsets. In certain embodiments, some of the subsets of antennas can include an overlapping or common antenna between these subsets. In some embodiments, each of the subsets can include an overlapping or common antenna with at least another subset. The SCM 222 can configure or form each subset of antennas to include antennas physically adjacent to each other on the beamformer. The SCM 222 can select or assign antennas to the subsets according to a certain order or sequence (e.g., a physical order or spatial arrangement of the antennas). In some embodiments, the SCM 222 can form each subset to include antennas that are separated from each other by at least another antenna not in the subset, e.g., to provide spatial degrees of freedom or separation.

In the case of coordinated beamformers, the coordinated beamformers can determine between themselves, subsets of spatial streams from the sum of spatial streams supported by the coordinated beamformers. For example, in the case of two coordinated beamformers, the two beamformers can determine, between the first beamformer and the second beamformer, a plurality of subsets of transmit spatial streams from the first plurality of transmit spatial streams and the second plurality of transmit spatial streams. In some embodiments, a SCM 222 of the coordinated beamformers, which can reside in one or both of the coordinated beamformers, or reside in another networked node, can determine the subsets of spatial streams or antennas for generating the soundings.

Referring now to operation 205, and in some embodiments, the beamformer can send a plurality of sounding frames to the beamformee for channel estimation based at least on the determined plurality of subsets of transmit spatial streams or antennas. In the case of coordinated beamformers operating like a single beamformer, the coordinated beamformers 106 can coordinate between themselves, or leverage on the SCM 222, to control transmission of a plurality of sounding frames to a first beamformee for channel estimation. For example, in the case of two coordinated beamformers, the coordinated beamformers or SCM 222 can coordinate between the first beamformer and the second beamformer, to transmit a plurality of sounding frames to a first beamformee for channel estimation based at least on the determined plurality of subsets of transmit spatial streams or antennas.

The SCM 222 can manage or control the transmission of the plurality of soundings corresponding to the subsets of antennas and/or transmit spatial streams. The SCM 222 or beamformer can transmit or issue the plurality of soundings in a particular order. The SCM 222 or beamformer can transmit or issue the plurality of soundings to be distributed or staggered with respect to one another over a period of time, e.g., at predefined intervals. The SCM 222 or beamformer can provide sufficient time for the beamformer to process each sounding and/or provide a response to each sounding, before sending a next sounding frame. The SCM 222 can store or update information about the configured subsets, and/or a sequence of corresponding soundings, to the configuration 224 and/or storage module 223.

The beamformee can send a response to the beamformer, responsive to each sounding frame communicated by the beamformer. The beamformee can perform channel estimation (e.g., via a CEM 212) corresponding to each sounding frame. The beamformee can include channel estimation feedback in each response. The beamformer can receive responses from the beamformee to the plurality of sounding frames, the responses including channel estimation for the plurality of subsets of transmit spatial streams. The beamformer can receive a response to each of the plurality of sounding frames. Each of the responses can include a partial channel description to the beamformer, for example, as discussed above in connection with FIGS. 2A and 2B.

An integration module 221 (e.g., as shown in FIG. 2A) of the beamformer can manage, track and/or process the responses received from the beamformee 102. The integration module 221 can identify and/or extract channel estimation information or feedback from each response. The integration module 221 can store information (e.g., channel estimation information) from one or more responses in a storage module 223. The integration module 221 can order and/or combine channel estimation information from the responses, for example, based at least in part on information stored in the configuration 224 (e.g., information about the configured subsets, and/or the sequence of soundings corresponding to the configured subsets). The integration module 221 can combine at least some responses from a first beamformee, the responses including channel estimation for the plurality of subsets of transmit spatial streams.

In some embodiments, the integration module 221 determines or identifies at least one overlapping (or common) antenna between subsets. The integration module 221 can correspond or map an overlapping antenna to elements in channel estimation information (e.g., channel estimation matrices) obtained from corresponding responses. The integration module 221 can use one of the identified elements to act as an anchor point, or point of reference or comparison, with the other corresponding elements. The integration module 221 can address, remove and/or adjust for a phase difference between different sets of channel estimation information by using the elements corresponding to the overlapping antenna. For example, the integration module 221 can use a phase value obtained from one set of channel estimation information to adjust or compensate against an element in another set of channel estimation information (e.g., that is also based on the overlapping antenna).

In some embodiments, the integration module 221 generates or establishes full channel estimation information based on the received responses. The integration module 221 can re-construct full channel estimation information based on the partial channel estimation feedback from each response. The full channel estimation information can include channel estimation information corresponding to the plurality of transmit spatial streams that the beamformer can provide. For example, in the case of two coordinated beamformers, the integration module 221 can generate full channel estimation information between the first beamformer and the second beamformer, based on a combination of at least some of the received responses. For instance, the integration module 221 can generate full channel estimation information between the first beamformer and the second beamformer for a beamformee, based on responses from that beamformee. The beamformer can steer the plurality of transmit antennas of the beamformer 106 based on the full channel estimation information established for a beamformee, to communicate with that beamformee. The beamformer can steer the plurality of transmit antennas based on full channel estimation information established for a plurality of beamformees, e.g., to achieve full array gain and/or diversity.

In some embodiments, depending on a context of operation of an AP 106 and/or a wireless device 102, the device 102 can operate as a beamformer, and the AP 106 can operate as a beamformee for instance. Accordingly, references to beamformer(s) and/or beamformee(s) in this disclosure are not limited to particular embodiments of an AP 106 and/or device 102 respectively. Operations 201, 203, and 205, for example, can be performed by beamformers like wireless devices 102 (e.g., STAs) in one embodiment. Some devices 102 can communicate with each other (e.g., with another wireless device 102), or with an AP 106 using the devices' antennas to send sounding frames. For example, devices 102 capable of multi-unit communication can include a soundings controller module 222, integration module 221, storage module 223, and configuration 224, for example as discussed in FIG. 2A, to request channel estimation of subsets of transmit spatial streams, for combination into full channel estimation results. Although the disclosure can reference one or more "users", such "users" can refer to user-associated devices or stations (STAs), for example, consistent with the terms "user" and "multi-user" typically used in the context of a MU-MIMO environment. Although examples of communications systems described above can include beamformers and beamformees operating according to an 802.11 standard, it should be understood that embodiments of the systems and methods described can operate according to other standards and use wireless communications devices other than devices configured as beamformers and beamformees. For example, multiple-unit communication interfaces associated with cellular networks, satellite communications, vehicle communication networks, and other non-802.11 wireless networks can utilize features described herein to achieve improved beam steering and/or overall capacity without departing from the scope of the systems and methods described herein.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., beamformers and/or beamformees) that can operate within a system or environment. It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for performing channel estimation, the method comprising:
    determining, by a beamformer, that a beamformee is configured to perform channel estimation for up to a pre-configured number of transmit spatial streams from the beamformer, the pre-configured number of transmit spatial streams is less than a plurality of transmit spatial streams of the beamformer;
    determining, by the beamformer, a plurality of subsets of transmit spatial streams from the plurality of transmit spatial streams, a first subset of the plurality of subsets having at least one transmit spatial stream from a same antenna of the beamformer as at least one transmit spatial stream in another subset from the plurality of subsets; and
    sending, by the beamformer, a plurality of sounding frames to the beamformee for channel estimation based at least on the determined plurality of subsets of transmit spatial streams.

2. The method of claim 1, wherein each of the plurality of subsets has at least one transmit spatial stream from an antenna of the beamformer that is common with that of at least one transmit spatial stream in another subset from the plurality of subsets.

3. The method of claim 1, further comprising receiving responses from the beamformee to the plurality of sounding frames, the responses comprising channel estimation for the plurality of subsets of transmit spatial streams.

4. The method of claim 3, further comprising generating full channel estimation information based on the received responses, the full channel estimation information comprising channel estimation information corresponding to all the transmit spatial streams that the beamformer can provide.

5. The method of claim 4, further comprising steering, by the beamformer, the plurality of transmit antennas of the beamformer based on the full channel estimation information.

6. The method of claim 1, further comprising configuring a first beamformer and a second beamformer to operate as the beamformer.

7. The method of claim 1, further comprising configuring a first beamformer and a second beamformer to operate as the beamformer, the first beamformer and the second beamformer operably coupled via a backbone connection.

8. The method of claim 1, further comprising communicating, by the beamformer, to a plurality of beamformees.

9. The method of claim 1, further comprising configuring a first beamformer and a second beamformer to operate as the beamformer, the first beamformer and the second beamformer using frequency diversity to simultaneously send a sounding frame from the first beamformer and a sounding frame from the second beamformer.

10. A system for performing channel estimation, the system comprising:
    circuitry of a beamformer, configured to
        determine that a beamformee is configured to perform channel estimation for up to a pre-configured number of transmit spatial streams from the beamformer, the pre-configured number of transmit spatial streams is less than a plurality of transmit spatial streams of the beamformer, and
        determine a plurality of subsets of transmit spatial streams from the plurality of transmit spatial streams, a first subset of the plurality of subsets having at least one transmit spatial stream from a same antenna of the beamformer as at least one transmit spatial stream in another subset from the plurality of subsets; and
    a plurality of antennas of the beamformer, configured to send a plurality of sounding frames to the beamformee for channel estimation based at least on the determined plurality of subsets of transmit spatial streams, each of the plurality of antennas corresponding to one of the plurality of transmit spatial streams.

11. The system of claim 10, wherein each of the plurality of subsets has at least one transmit spatial stream from an antenna of the beamformer that is common with that of at least one transmit spatial stream in another subset from the plurality of subsets.

12. The system of claim 10, further comprising an integration module configured to combine channel estimation for the plurality of subsets of transmit spatial streams, the channel estimation from responses received from the beamformee to the plurality of sounding frames.

13. The system of claim 10, wherein the plurality of antennas comprises at least one antenna of a first beamformer and at least one antenna of a second beamformer, the first beamformer and the second beamformer configured to operate as the beamformer.

14. A method for performing channel estimation, the method comprising:
  configuring a first beamformer and a second beamformer to communicate with a first beamformee, the first beamformer supporting a first plurality of transmit spatial streams, and the second beamformer supporting a second plurality of transmit spatial streams;
  determining, between the first beamformer and the second beamformer, a plurality of subsets of transmit spatial streams from the first plurality of transmit spatial streams and the second plurality of transmit spatial streams, a first subset of the plurality of subsets having at least one transmit spatial stream from a same antenna of the first or second beamformer as at least one transmit spatial stream in another subset from the plurality of subsets; and
  coordinating, between the first beamformer and the second beamformer, transmission of a plurality of sounding frames to the first beamformee for channel estimation based at least on the determined plurality of subsets of transmit spatial streams.

15. The method of claim 14, further comprising configuring the first beamformer and the second beamformer to communicate with the first beamformee, the first beamformer and the second beamformer operably coupled via a backbone connection.

16. The method of claim 14, further comprising combining at least some responses from the first beamformee to the plurality of sounding frames, the responses comprising channel estimation for the plurality of subsets of transmit spatial streams.

17. The method of claim 16, further comprising generating full channel estimation information between the first beamformer and the second beamformer, based on the combination of the at least some responses.

18. The method of claim 14, further comprising configuring the first beamformer and the second beamformer to communicate with a plurality of beamformees.

19. The method of claim 14, further comprising coordinating, between the first beamformer and the second beamformer, transmission of a plurality of sounding frames to a plurality of beamformees.

20. The method of claim 14, further comprising using frequency diversity to simultaneously send a sounding frame from the first beamformer and a sounding frame from the second beamformer.

* * * * *